United States Patent
Seino et al.

(10) Patent No.: US 8,071,236 B2
(45) Date of Patent: Dec. 6, 2011

(54) LAMINATED PACKAGING MATERIAL, AND BATTERY USING THE MATERIAL

(75) Inventors: Hiroshi Seino, Fukushima (JP);
Hiroyuki Yamada, Fukushima (JP);
Fumihata Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 876 days.

(21) Appl. No.: 12/119,816

(22) Filed: May 13, 2008

(65) Prior Publication Data

US 2008/0286635 A1    Nov. 20, 2008

(30) Foreign Application Priority Data

May 16, 2007    (JP) .................................. 2007-130648

(51) Int. Cl.
*H01M 2/08* (2006.01)
*H01M 2/02* (2006.01)
*H01M 2/00* (2006.01)

(52) U.S. Cl. .................. 429/185; 429/176; 429/163
(58) Field of Classification Search ................. 429/163, 429/185, 176
See application file for complete search history.

(56) References Cited

FOREIGN PATENT DOCUMENTS

| JP | 3-062447 | 3/1991 |
|---|---|---|
| JP | 2005-063685 | 3/2005 |

*Primary Examiner* — Helen O Conley
(74) *Attorney, Agent, or Firm* — K&L Gates LLP

(57) ABSTRACT

A laminated packaging material and a battery using the material are disclosed. The material includes an inner layer composed of a resin film, a first adhesive layer, a metal layer, a second adhesive layer, and an outer layer composed of a resin film. At least one of the first adhesive layer or the second adhesive layer is composed of an adhesive composition, as an essential component, selected from the group consisting of a resin having an active hydrogen group in a side chain, polyfunctional isocyanates, and a polyfunctional amine compound.

5 Claims, 2 Drawing Sheets

LAMINATED PACKAGING MATERIAL, AND BATTERY USING THE MATERIAL

CROSS-REFERENCE TO RELATED APPLICATIONS

The present application claims priority to Japanese patent Application No. 2007-130648 filed in the Japanese Patent Office on May 16, 2007, the entire disclosure of which is incorporated herein by reference.

BACKGROUND

The present application relates to a laminated packaging material to be subjected to molding.

Laminated packaging materials have been widely used in fields such as food products, medical care, and electronic components. The laminated packaging materials may suffer damages such as pinholes, cracks, or delaminations during molding. Amid demands for high-speed and accurate molding in particular, properties of the laminated packaging materials greatly affect moldability.

A secondary battery is known in the field of electronic components. The secondary battery, for example, uses a laminated packaging material as a packaging member thereof and is formed by inserting a battery element into the packaging member and sealing it by fusion-bonding edges of the packaging member together (e.g., Japanese Unexamined Patent Application Publication No. H03-62447). The laminated packaging material enables the secondary battery to be further smaller in size, lighter in weight, and thinner in thickness, thereby improving the energy density.

Furthermore, as an example in which attention is paid to an adhesive layer of a laminated packaging material, a packaging material for a battery case has been proposed in which a polyolefinpolyol adhesive and a polyfunctional isocyanate curing agent are used in bonding an aluminum layer and a thermoplastic resin inner layer (e.g., Japanese Unexamined Patent Application Publication No. 2005-63685).

However, since the laminated packaging material is thin as compared with conventional metallic containers, the conventional laminated packaging materials are susceptible to pinholes or cracks, and further, delaminations may likely occur due to being laminated. Hence, there has been room for improvement.

SUMMARY

Accordingly, it is desirable to provide a laminated packaging material having high reliability for deeper molding, and not decreasing adhesion strength between a metal layer and an inner or an outer layer, nor delaminating even if a highly permeable substance or the like is packaged for a long time period, and a battery both using such a laminated packaging material.

The present inventors have found out that a laminated packaging material in which flexibility and rigidity are conferred in a well-balanced manner in the adhesive layer can be obtained by blending a polyfunctional amine compound with an adhesive composition containing polyfunctional isocyanates as a curing agent, and have thus implemented embodiments. Namely, according to embodiments, there are provided a laminated packaging material, and a battery covering member and a battery both using the laminated packaging material. In accordance with an embodiment, there is provided a laminated packaging material which includes an inner layer composed of a resin film, a first adhesive layer, a metal layer, a second adhesive layer, and an outer layer composed of resin film. At least one of the first adhesive layer or the second adhesive layer is composed of an adhesive composition, as an essential component, selected from the group consisting of a resin having an active hydrogen group in a side chain, polyfunctional isocyanates, and a polyfunctional amine compound.

According to the laminated packaging material in an embodiment, flexibility and rigidity in the adhesive layer are so well-balanced that reliability is high for deeper molding, adhesion strength between the metal layer and the adhesive layer is not decreased and hence occurrence of delaminations can be suppressed even if a highly permeable substance or the like is packed for a long time period.

Additional features and advantages are described herein, and will be apparent from the following Detailed Description and the figures.

DETAILED DESCRIPTION

<Laminated Packaging Material>

Figure 1:
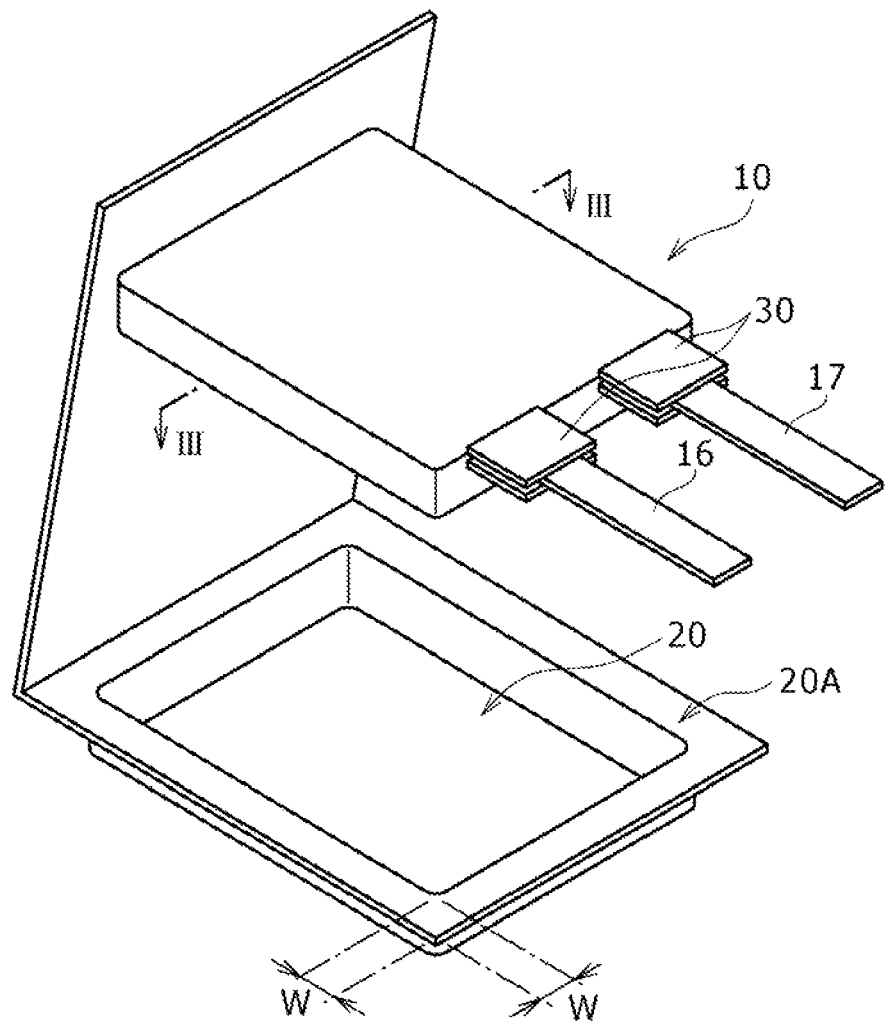
FIG. 1 is an exploded perspective view representing a configuration of a secondary battery according to an embodiment.

A laminated packaging material according to an embodiment has a basic configuration including an inner layer composed of a resin film, a first adhesive layer, a metal layer, a second adhesive layer, and an outer layer composed of a resin film.

(Outer Layer Composed of Resin Film)

A material for a resin film used as the outer layer may preferably be a heat-resistant resin. Other properties of the resin, such as resin types, mechanical properties, thickness, and degree of crystallization, may be selected according to features to be imparted to the packaging material. The heat-resistant resin material may include nylons such as nylon 6, nylon 66, and nylon 12, and polyarylates such as polyethylene terephthalate and polybutylene terephthalate. For general-purpose applications, polyethylene terephthalate is particularly suitable. Only one kind of heat-resistant resin may be used, but two or more kinds of heat-resistant resins may alternatively be used. The film thickness may preferably range from 9 to 50 µm. If the thickness is less than 9 µm, the film for deep drawing is not elongated sufficiently during molding into the packaging material, thereby causing necking in aluminum foil, and hence easily resulting in defective molding. Meanwhile, if the thickness exceeds 50 µm, there is no particular contribution to better moldability, but the volumetric energy density is rather decreased and also the cost is increased.

(Metal Layer)

For the metal layer, metallic foil used as a typical laminated packaging material may be used, which includes Al, Cu, SUS, and Au. Typically, Al is preferable in terms of elongation, cost, and moldability. The thickness of the metallic foil is preferably in a range from 20 to 100 µm, or more preferably from 25 to 55 µm. If the aluminum foil is thinner than 20 µm, the aluminum foil may be broken during molding or pinholes may occur, thereby making it likely to allow entrance of oxygen and moisture therein. Meanwhile, if the aluminum foil is thicker than 100 μm, it is not preferable since no particular contribution is exhibited to prevent the breakage during molding or pinhole occurrence, and in addition, the total thickness of the packaging material is increased, the weight is increased, and the volumetric energy density is decreased. Furthermore, in order to improve adhesion and corrosion resistance, the metal layer may be subjected to a chemical conversion treatment such as an undercoating process using a silane coupling agent. As the aluminum foil, usually, pure aluminum such as JIS IN30 or 8000-series alloys may be used.

(Inner Layer Composed of Resin Film)

The inner layer acts as a sealant layer for hermetically sealing the packaging material by causing outer edges of the packaging material to adhere. Accordingly, the inner layer is preferably composed of a thermoplastic resin material. As a result, among inner layers can be fusion-bonded, thereby hermetically sealing the packaging material. Furthermore, from the viewpoints of fusion-bondability and operability, a dynamic frictional coefficient of the resin surface is preferably not more than 0.2. Furthermore, a melt flow rate (MFR) as another physical property is preferably not less than 0.5 and not more than 20.0 g/10 min. The thermoplastic material includes polyolefin resins, such as polyethylene, polypropylene, modified polyethylene, or modified polypropylene. The modified polyethylene includes maleic acid-modified polyethylene having carbonyl groups, and that the modified polypropylene includes maleic acid-modified polypropylene having a carbonyl group. Of the thermoplastic materials, only one kind may be used, but two or more kinds may alternatively be used. The thickness of the inner layer is preferably not more than 50 μm, more preferably not less than 3 μm, or most preferably in a range from 15 to 30 μm. If the inner layer is thicker than 50 μm, plenty of moisture is likely to enter into the inner layer, whereas if the inner layer is thinner than 3 μm, fusion-bondability is decreased.

In order to confer additional properties such as strength in the packaging material, a structure may be adopted, as necessary, in which an intermediate resin layer is added between the outer layer and the metal layer or between the inner layer and the metal layer. Also, the resin layers forming the outer layer and the inner layer each may be formed of a single layer or a plurality of layers.

(Adhesive Layer)

The laminated packaging material according to an embodiment includes the first adhesive layer between the metal layer and the inner layer, and includes the second adhesive layer between the metal layer and the outer layer. At least one of the first adhesive layer or the second adhesive layer (these may be called simply as "adhesive layers" whenever applicable) is composed of an adhesive composition containing a resin having an active hydrogen group in a side chain, polyfunctional isocyanates, and a polyfunctional amine compound.

The resin having an active hydrogen group in a side chain acts as an adhesive (a main agent). The active hydrogen groups in the resin react with isocyanate groups or isothiocyanate groups in later-described polyfunctional isocyanates, to confer adhesiveness on the resin. Examples of the active hydrogen groups include hydroxyl groups, amino groups, and thiol groups.

Here, in order to obtain advantages based on the addition of the polyfunctional amine compound, it is required that the reaction of the active hydrogen groups in the adhesive with a later-described polyfunctional amine compound prevail over their reaction with the polyfunctional isocyanates. From this viewpoint, in order to give a difference to the reactivity with the polyfunctional amine compound, it is preferable that the reactivity of the active hydrogen groups in the adhesive resin with the polyfunctional isocyanates is lower than with the polyfunctional amine compound. If the active hydrogen group is an amino group, the reactivity changes greatly depending on whether the group is an aromatic amine or an aliphatic amine. Furthermore, the reactivity is affected greatly by the difference in pKa (acid-base dissociation constant) between the amino groups. For this reason, it may sometimes be difficult to control the reactivity of the amino groups as the main agent with the polyfunctional amine compound. When the amino groups are used as the active hydrogen groups, a molecular design reflecting proper reactivity is needed. Accordingly, the active hydrogen group in the adhesive resin is desirably a hydroxyl group or a thiol group that exhibits a clear difference in the reactivity with the polyfunctional amine compound, from their reactivity with the polyfunctional isocyanates.

Examples of the resin having an active hydrogen group in a side chain includes those obtained by adding a comonomer having an active hydrogen group in a side chain, to a polyolefin such as polyethylene, polypropylene, and polystyrene, and those structures such as urethane adhesives, epoxy adhesives, and polyester adhesives which have an active hydrogen group in a side chain and which can be cured by a later-described isocyanate curing agent. Particularly, polypropylene resins having an active hydrogen group in a side chain are preferable.

For the adhesive composition, in addition to the above-mentioned adhesives, the polyfunctional isocyanates and the polyfunctional amine compound are contained as the essential component. The polyfunctional isocyanates are contained as a curing agent, and the polyfunctional amine compound is contained as an additive. The polyfunctional isocyanates mean compounds having polyfunctional isocyanate groups or polyfunctional isothiocyanate groups. The isocyanate groups or the isothiocyanate groups may also be called simply "isocyanate groups" for convenience.

Generally, an amino group and an isocyanate group react with each other to form a urea linkage. Since the isocyanates and amine compound used in embodiments are polyfunctional compounds, they have a plurality of isocyanate groups or amino groups in one molecule, respectively. When such an isocyanate compound and an amine compound react with each other, a system is considered in which isocyanate groups being one of the two groups in the isocyanate compound and amino groups being one of the two groups in the amine compound form urea linkages, and further, amino groups being the other of the two groups in the amine compound and isocyanate groups being the one of the two groups in the isocyanate compound react with each other to produce an oligourea polyisocyanate as a reaction product. In this way, by incorporating the amine compound into the polyfunctional isocyanates via the urea linkages, the molecular chain between the isocyanate groups at both ends is elongated. Furthermore, since isocyanate groups not reacting with the amine compound exit at both ends of the reaction product, the function as a curing agent will not be lost.

The reaction system is described, taking an example in which 1,4-phenylenediisocyanate (PDI) and 1,4-phenylenediamine (PDA) react with each other. By causing one molecule of PDA to react with two molecules of PDI, a diisocyanate compound (P3DI) is produced, in which three phenylene chains are united via urea linkages. Then, when P3DI reacts with one molecule of PDI and with one molecule of PDA, a diisocyanate compound is produced in which five phenylene chains are united.

The polyfunctional isocyanate to be blended as a curing agent is preferably a compound having two or more, or preferably two or three isocyanate groups or isothiocyanate groups in one molecule, or preferably a compound having isocyanate groups from the viewpoint of reactivity. Specifically, the compound having isocyanate groups includes diisocyanates synthesized from diamines such as toluenediisocyanate, diphenylmethanediisocyanate, oxydiphenylenediisonyanate, hexamethylenediisocyanate, isophorone diisocyanate, and those obtained by isocyanaurate modification or burrette modification of these diisocyanates or by adduct modification of them with polyhydric alcohol such as trimethylolpropane. In addition, triisocyanates synthesized from triamines may also be used. The triisocyanates may be used by modifications similar to those of the diisocyanates. From the viewpoint of cost, a toluenediisocyanate is preferable. It suffices that at least one kind of these curing agents is used. Any mixture of two or more kinds of them may also be used without problem.

The amount of addition of polyfunctional isocyanates is preferably in a range from 1.0 to 15.0 in a molar ratio (NCO/XH) of an isocyanate group to an active hydrogen group in the resin having an active hydrogen group in a side chain in the adhesive composition. If the amount is less than 1.0, curing is not enough, whereas if the amount exceeds 15.0, the number of isocyanate groups not contributing to crosslinking increases to act as a plastic agent or the like, so that even if the amine compound is added, its effect is less. The amount of addition may more preferably be in a range from 1.5 to 10.0 or most preferably from 2.0 to 5.0, from the viewpoints of laminate strength and moldability.

The polyfunctional amine compound blended as an additive may preferably be a compound having two or more, or more preferably two or three amino groups in one molecule. Specifically, the compound having amino groups includes diamines such as phenylenediamine, tolylenediamine, diaminodiphenylmethane, oxydiphenylenediamine, hexamethylenediamine, and isophoronediamine, and triamines such as triaminobenzene, tris(aminophenyl)methane, and (diaminophenyl)(monoaminophyenyl)ether. In addition, the compound having amino groups includes those modified by causing these amines to react with a polyfunctional isocyanate or a polyfunctional carboxylic acid derivative. A terminal amine prepolymer is one such an example. Furthermore, both aromatic amines and aliphatic amines similarly provide advantages, but the aromatic amines are more preferable due to the mild reactivity. It may suffice that only one kind of these amines is used as additives, but a mixture of two or more kinds may alternatively be used without problem.

The curing agent having molecular chains of different lengths, which is produced from the polyfunctional isocyanates and the polyfunctional amine compound, are produced in a ratio corresponding to a normal distribution. Namely, the curing agent has a molecular weight distribution. Here, the amount of the polyfunctional amine compound added preferably exceeds 0 and is not more than 0.5 in a molar ratio ($NH_2$/NCO) of an amino group in the polyfunctional amine compound to an isocyanate group or an isothiocyanate group in the polyfunctional isocyanates in the adhesive composition. If the amount exceeds 0.5, the number of amino groups stoichiometrically exceeds a half of the number of isocyanate groups. Hence, the amino groups excessively react with the isocyanate groups, thereby making it likely to reduce the number of isocyanate groups or isothiocyanate groups in the reaction product to reduce the function as a curing agent.

Furthermore, the amount of addition may more preferably be in a range from 0.05 to 0.30, or most preferably from 0.1 to 0.15, from the viewpoints of laminate strength and moldability.

Furthermore, it is preferable that the amount of the polyfunctional isocyanates added (NCO/XH) and the amount of the polyfunctional amine compound added ($NH_2$/NCO) satisfy the following relationship:

$$[(NCO/XH)-(NCO/XH)\times(NH_2/NCO)]\geq 1$$

By causing the curing agent having molecular chains of different lengths to react with the adhesive and thus by curing the curing agent, crosslinking densities are distributed within the adhesive layer, so that an adhesive layer having flexibility and rigidity conferred thereon in good balance can be provided. Namely, with the crosslinking densities distributed within the adhesive layer, the adhesive layer becomes easy to deform by following different elongations between the resins forming the outer layer/the inner layer and the metal layer, so that increased adhesion strength between the resin layers and the metal layer can be kept strongly. Generally, with the molding of a packaging material, strain occurs due to differences in elongation rate between the resin layers and the metal layer, which then leads to occurrence of pinholes, cracks, or delaminations, and also to, e.g., a reduction in resistance to an electrolyte solution of the packaging material when a battery is contained in the packaging material. However, according to an embodiment, because of the above-described mechanism, the addition of the polyfunctional amine to the adhesive composition that is not yet cured, enables the properties of the laminated packaging material to improve greatly.

The fact that the polyfunctional amine compound was added to the adhesive layer may be verified by infrared (IR) spectroscopy or nuclear magnetic resonance (NMR) spectroscopy. In IR spectra, the absorption of a carboxyl group and the absorption of an NH group become broad. In NMR spectra also, the peak of an NH group similarly becomes broad in 1H-NMR.

The following tendency is observed in spectral changes caused by the addition of the polyfunctional amine compound.

In the IR spectra, a measure A decreases with addition of amine when the measure A representing broadness with respect to the absorption of a certain functional group is defined by the following formula:

$A=$"Peak absorption intensity"÷("Absorption start wave number"−"Absorption end wave number")

In 1H-NMR, the measure A is defined similarly by the following formula:

$A=$"Peak area"÷("Absorption start chemical shift"− "Absorption end chemical shift")

Since the value for A greatly varies with different kinds of adhesives and curing agents and with different amounts of them added, how the value for A is varied to what degree by the addition of amine cannot be defined automatically. In adhesives according to Examples, approximately, the following results were obtained.

"A in system with amount of amine added ($NH_2$/NCO)"÷"A in system with no addition of amine"="1+($NH_2$/NCO)/2"

For example, the value for A in a system in which ($NH_2$/NCO) was 0.2 was 1.1 times that in a system in which no amine was added.

For the adhesive composition, various additives such as a tackifier may be added in proper amounts according to the intended adhesive property. Specifically, a polyacrylester oligomer and the like may be added.

It may suffice that the above-mentioned adhesive composition is applied to at least one of the first adhesive layer or the second adhesive layer of the laminated packaging material. However, the adhesive composition may also be applied to both adhesive layers. When the laminated packaging material according to an embodiment is used in the field of electronic components such as battery covering members, the resistance to an electrolyte solution need be considered. Hence, it is preferable that at least the first adhesive layer on the inner layer side be composed of the adhesive composition. In this case, for the adhesive layer on the outer layer side, a known adhesive such as, e.g., AD-585 manufactured by Toyo-Morton, Ltd. may be used.

(Method for Manufacturing a Laminated Packaging Material)

First, as a method for preparing the adhesive composition, it is desirable to follow the procedure in which first a dilute solution of the curing agent (the polyfunctional isocyanates) is added to a dilute solution of the adhesive component (resin having active hydrogen groups in a side chain), and then a dilute solution of the polyfunctional amine is added to the resultant solution. If the amine compound and the isocyanates are mixed first, a gel is easy to occur due to copolymerization, changes in solubility, and the like. As a solvent of the dilute solution of the adhesive component (resin having active hydrogen groups in a side chain), toluene, ethyl acetate, 2-butanone, or the like may be used, with the rate of dilution preferably ranging from 1 to 10 mass %. This is because such conditions provide a low viscosity and an easy adjustment, and an abrupt reaction is hard to occur when the curing agent is added to the dilute solution. Furthermore, as a solvent of the dilute solution of the curing agent (polyfunctional isocyanates), toluene, ethyl acetate, 2-butanone, or the like may be used, with the rate of dilution preferably ranging from 0.5 to 5 mass %. This is because such conditions reduce the tendency to cause an abrupt reaction when the dilute solution is mixed with the adhesive component. As a solvent of the dilute solution of the polyfunctional amine, toluene, ethyl acetate, 2-butanone, or the like may be used. The dilute solution of the polyfunctional amine need not be diluted at a high rate since it is sufficiently diluted by the dilute solutions of the adhesive component and the curing agent. It suffices that the solution be diluted at such a rate as to prevent local reaction when the polyfunctional amine is added, preferably at rates ranging from 5 to 30 mass %. It is desirable to add the polyfunctional amine by dropping it while slowly stirring it.

Furthermore, it is desirable to manufacture the laminated packaging material under fixed temperature and humidity. Specifically, it is desirable to perform processing under temperatures ranging from 15 to 30° C. and under humidities ranging from 20 to 50% RH. This is because change in temperature and humidity affects ambient moisture, thereby changing the hydrolitic ratio of the isocyanates.

Then, using a known method such as a gravure coating method or a roll coating method, the adhesive composition is coated to one of surfaces of metallic foil forming the metal layer, and then the resultant surface is dried at high temperatures ranging from 190 to 230° C. to remove the solvents. The adhesive layer is thus formed. Successively, a resin film for the inner layer is laminated on the coated surface, and then the resultant body is compression-bonded into a laminate by a roll heated to 190° C. or higher. The amount of the adhesive composition coated is preferably in a range from 1 to 40 g/m$^2$, and particularly preferably from 2 to 25 g/m$^2$ (as dried). If the amount coated is less than 1 g/m$^2$, it is likely to reduce adhesion strength and also to cause peeling or floating during deep drawing. If the amount coated exceeds 40 g/m$^2$, sealing strength is not improved any further, nor is it preferable for economic reasons. The outer layer side is similarly processed. Thereafter, by keeping the resultant laminate under 40 to 60° C., the adhesive composition is cured to obtain the laminated packaging material according to an embodiment.

<Battery Covering Member and Battery>

Embodiments of a battery covering member and a battery will be described below in detail with reference to the drawings.

FIG. 1 illustrates a secondary battery according to an embodiment in a dismantled form. The secondary battery contains a battery element 10 in a covering member 20 molded by deep drawing or punch stretching using the laminated packaging material according to an embodiment.

Figure 2:
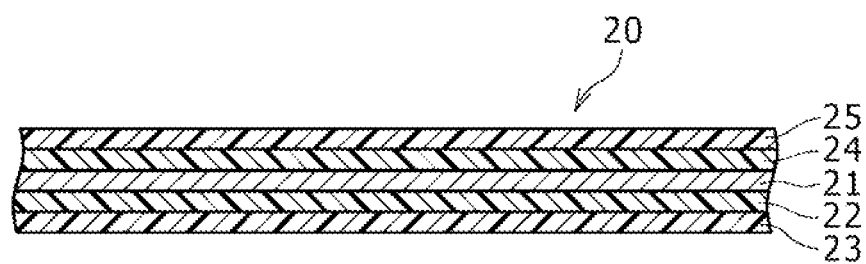
FIG. 2 is a sectional view representing a configuration of a covering member according to an embodiment.

FIG. 2 illustrates a sectional structure of the covering member 20 according to an embodiment shown in FIG. 1. The covering member 20 has a structure in which a resin layer 23 (the inner layer), an adhesive layer 22 (the first adhesive layer), a metal layer 21, an adhesive layer 24 (the second adhesive layer), and a resin layer 25 (the outer layer) are sequentially laminated.

The covering member 20 is sealed by a sealing portion 20A provided along an outer periphery of the resin layer 23 (the inner layer). A sealing width W of the sealing portion 20A is preferably not less than 1 mm and not more than 5 mm, and more preferably not less than 1 mm but less than 3 mm. This is because it is difficult to seal the covering member 20 reliably if the sealing width W is too narrow, whereas the volume and weight of the battery increase to reduce its energy density if the sealing width W is too wide.

Figure 3:
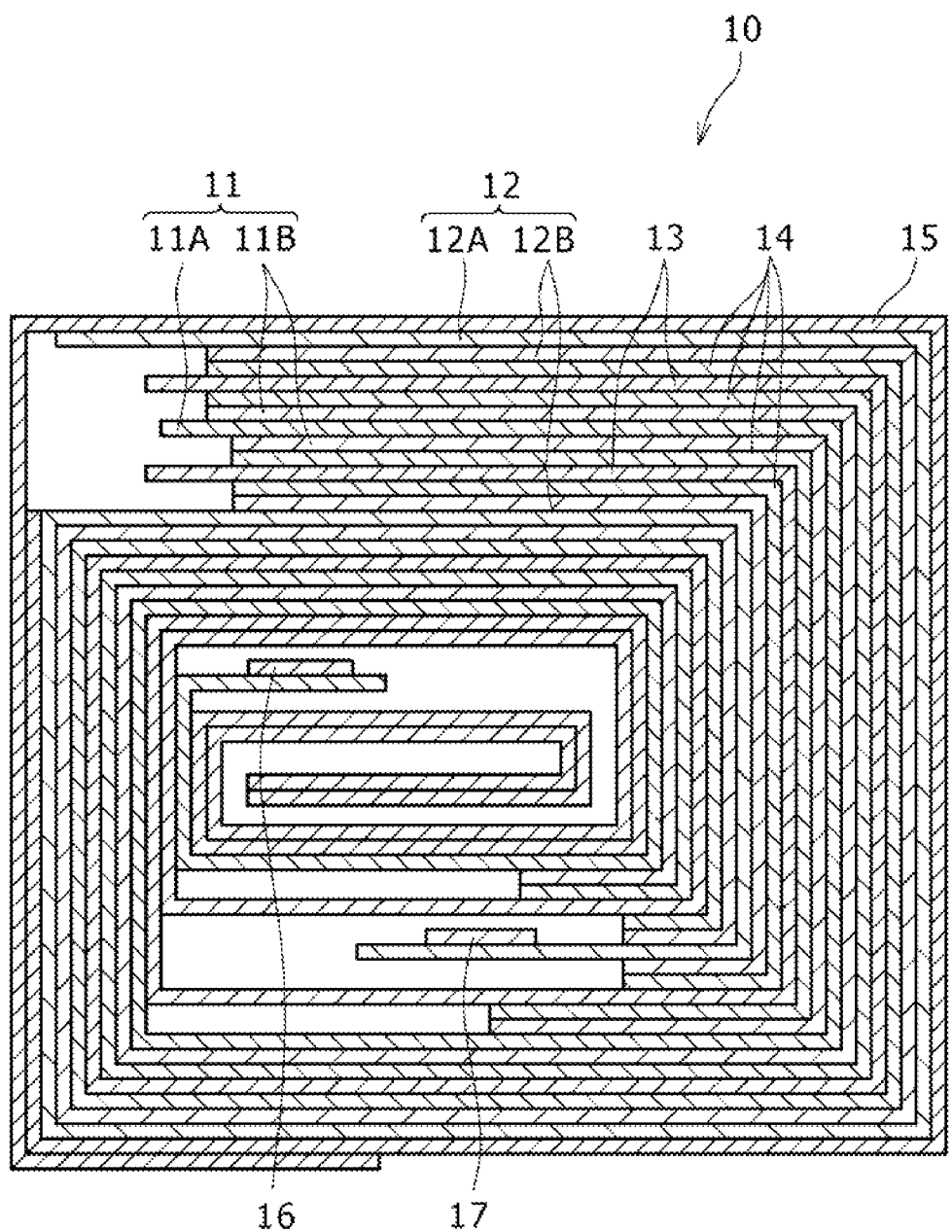
FIG. 3 is a sectional view representing a configuration taken along a line III-III of a battery element shown in FIG. 1.

FIG. 3 illustrates a sectional structure taken along a line III-III of the battery element 10 shown in FIG. 1. The battery element 10 is formed by winding a laminate which is formed by laminating a positive electrode 11 and a negative electrode 12 via a separator 13 and electrolyte layers 14. The outermost surfaces are protected by a protective tape 15. A positive electrode terminal 16 composed of, e.g., aluminum is connected to the positive electrode 11, and a negative electrode terminal 17 composed of, e.g., nickel is connected to the negative electrode 12. The positive electrode terminal 16 and the negative electrode terminal 17 are extended outward, e.g., in the same direction, from the inside of the covering member 20 (see FIG. 1).

The positive electrode 11 has, e.g., an positive electrode collector 11A, and an positive electrode mixture layer 11B provided on both or one of surfaces of the positive electrode collector 11A. The positive electrode collector 11A is composed of, e.g., aluminum, nickel, stainless steel, or the like. The cathode mixture layer 11B contains a cathode material (hereinafter called "lithium-dopable/dedopable cathode material") capable of doping or dedoping lithium, as a cathode active material, and may additionally contain a conductive agent such as a carbon material and a binder such as vinylidene fluoride, as necessary.

The lithium-dopable/dedopable cathode material may preferably be, e.g., metal oxides, metal fluorides, or specific polymeric materials, from which either one kind or two or more kinds are selected according to the intended use of the battery.

The metal oxides include lithium-transition metal composite oxides having $Li_xMo_2$ as the major ingredient, and $V_2O_5$. Particularly, composite oxides are preferable since they can increase voltage and energy density. In the above composition formula, it is preferable that M contain one or more kinds of transition metals, or particularly, at least one kind selected from the group consisting of cobalt (Co), nickel, and manganese (Mn). The value for x varies depending on charging/discharging conditions of the battery, and is normally within $0.05 \leq x \leq 1.10$. Specific examples of lithium composite oxides such as above include $LiCoO_2$, $LiNiO_2$, $LiNi_yCO_{1-y}O_2$ (0<y<1 in the formula), and $LiMn_2O_4$ having a spinel structure.

The metal fluorides may include $TiS_2$ and $MoS_2$. The polymeric materials include polyacetylene and polypyrrol. Other lithium-dopable/dedopable cathode materials such as $NbSe_2$ may be usable.

The negative electrode 12 includes, similarly to the positive electrode 11, e.g., a negative electrode collector 12A and a anode mixture layer 12B provided on both or one of surfaces of the negative electrode collector 12A. The negative electrode collector 12A is composed of, e.g., copper, nickel, stainless steel, or the like.

The anode mixture layer 12B contains, e.g., either one kind or two or more kinds of anode materials (hereinafter called "lithium-dopable/dedopable anode materials") capable of doping or dedoping lithium as an anode active material, and may additionally contain a binder such as vinylidene fluoride, as necessary.

The lithium-dopable/dedopable anode materials include carbon materials, metal oxides, and polymeric materials. The carbon materials include, e.g., pyrolitic carbons, coke, graphites, glassy carbons, organic polymer compound baked bodies, carbon fibers, spherical carbons, and activated carbons. Among them, coke includes pitch coke, needle coke, and petroleum coke, whereas the organic polymer compound baked bodies include carbonized substances obtained by baking polymeric materials such as phenol resins or furan resins at an appropriate temperature. Furthermore, the metal oxides include iron oxides, ruthenium oxides, and molybdenum oxides, whereas the polymeric materials include polyacetylene and polypyrrol.

Furthermore, the lithium-dopable/dedopable anode materials may also include pure metallic elements or pure metalloid elements that are alloyable with lithium, and their alloys or compounds. The alloys include those composed of two or more kinds of metallic elements, and additionally, those composed of one or more kinds of metallic elements and one or more kinds of metalloid elements. Their structures include solid solutions, eutectics (eutectic mixtures), intermetallic compounds, and any combination in which two or more kinds of the above coexist.

The metallic elements or metalloid elements that are alloyable with lithium include, e.g., magnesium (Mg), boron (B), arsenic (As), aluminum, gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd), and platinum (Pt). Their alloys or compounds include, e.g., those represented by a chemical formula $Ma_sMb_tLi_u$, or a chemical formula $Ma_pMc_qMd_r$. In these chemical formulae, Ma represents at least one kind of metallic elements and metalloid elements that are alloyable with lithium, Mb represents at least one kind of metallic elements and metalloid elements other than lithium and Ma, Mc represents at least one kind of nonmetallic elements, and Md represents at least one kind of metallic elements and metalloid elements other than Ma. Also, values for s, t, u, p, q, and r are s>0, t≧0, u≧0, p>0, q>0, and r≧0, respectively.

Among others, pure metals, alloys or compounds, of Group IVB metallic elements or metalloid elements in the short-period form of the periodic table are preferable; particularly preferable is silicon or tin, or their alloy or compound, irrespective of their being crystalline or amorphous.

Specific example of such alloys or compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≦2), $SnO_w$ (0<w≦2), $SnSiO_3$, LiSiO, and LiSnO.

The separator 13 separates the positive electrode 11 from the negative electrode 12, and allows lithium ions to pass therethrough while preventing short-circuits of current due to contact of both electrodes. This separator 13 is composed of, e.g., a synthetic resin porous film composed of polytetrafluoroethylene, polypropylene or polyethylene, or an inorganic porous film such as a ceramic unwoven fabric, or may have a structure in which two or more kinds of these porous films are laminated.

The electrolyte layer 14 is formed by containing a gel electrolyte or a solid electrolyte. The gel electrolyte is prepared by, e.g., causing a polymer compound to hold an electrolyte solution having a lithium salt being an electrolyte salt dissolved in a solvent. The polymer compound may include, e.g., ether polymer compounds, such as polyethylene oxides or crosslinked bodies containing polyethylene oxides, ester polymer compounds such as polymethacrylate, acrylate polymer compounds, and fluorine polymer compounds such as polyvinylidene fluoride or vinylidene fluoride-hexafluoropropylene copolymers, and either one kind or a mixture of two or more kinds thereof are used. Particularly, it is desirable to use fluorine polymer compounds from the viewpoint of oxidation-reduction stability.

As other polymer compounds, e.g., polyacrylonitrile and polyacrylonitrile copolymers may be used. Their copolymerizable monomers may also be used, which may include, e.g., vinyl monomers such as vinyl acetate, methyl methacrylate, butyl methacrylate, methyl acrylate, butyl acrylate, itaconic acid, methylacrylate hydride, ethylacrylate hydride, acrylamide, vinyl chloride, vinylidene fluoride, and vinylidene chloride. Furthermore, acrylonitrile-butadiene rubbers, acrylonitrile-butadiene-styrene resins, acrylonitrile-polyethylenechloride propylene diene styrene resins, acrylonitrile-vinylchloride resins, acrylonitrile-methacrylate resins, or acrylonitrile-acrylate resins may also be used.

The solvent include propylenecarbonate, ethylenecarbonate, diethylcarbonate, methylethylcarbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propylnitrile, anisole, ester acetate, and ester propionate, and one kind or a mixture of two or more kinds thereof may be used.

The lithium salt include, e.g., lithium chloride (LiCl), lithium bromide (LiBr), lithium iodide (LiI), lithium chlorate ($LiClO_3$), lithium perchlorate ($LiClO_4$), lithium bromate ($LiBrO_3$), lithium iodate ($LiIO_3$), lithium nitrate ($LiNO_3$), lithium tetrafluoroborate ($LiBF_4$), lithium hexafluorophosphate ($LiPF_6$), lithium acetate ($CH_3COOLi$), lithium bis(trifluoromethanesulfonyl)imide (($CF_3SO_2)_3NLi$), lithium bis (pentafluoroethanesulfonyl)imide (($C_2F_5SO_2)_3NLi$), lithium hexafluoroarsenate ($LiAsF_6$), lithium trifluoromethanesulfonate ($LiCF_3SO_3$), lithium tris(trifluoromethanesulfonyl)methyl ($LiC(SO_2CF_3)_3$), lithium tetrachloroalminate ($LiAlCl_4$), and lithium hexafluorosilicate ($LiSiF_6$), and one kind or a mixture of two or more kinds thereof may be used. Among others, it may be preferable to use $LiPF_6$ or $LiBF_4$ from the viewpoint of oxidation stability.

The content of these lithium salts in the gel electrolyte is preferably in a range from 0.1 mol/l to 3.0 mol/l, or more preferably from 0.5 mol/l to 2.0 mol/l.

As the solid electrolyte, e.g., a polymeric solid electrolyte in which an electrolyte salt is dispersed in a polymer compound having ion conductivity, or an inorganic solid electrolyte composed of an ion-conductive glass or an ionic crystal may be used. When the solid electrolyte is used, the separator 13 may be eliminated. The polymer compound in the polymeric solid electrolyte may include, e.g., silicon gels, acrylic gels, acrylonitrile gels, polyphosphazene modified polymers, polyethylene oxides, polypropylene oxides, and their composite polymers, crosslinked polymers, and modified polymers. In addition, polyvinylidene fluoride, vinylidene fluoride-hexafluoropropylene copolymers, vinylidene fluoride-tetrafluoroethylene copolymers, vinylidene fluoride-trifluoroethylene copolymers, and the like may also be used.

In the secondary battery, as already shown in FIG. 1, resin strips 30 for preventing entrance of external air are inserted between the covering member 20 and the positive electrode terminal 16 and the negative electrode terminal 17 of the battery element 10, respectively. The resin strips 30 avoid short-circuits due to burs or the like of the positive electrode terminal 16 and the negative electrode terminal 17, and also enhance intimate contact between the positive electrode terminal 16/the negative electrode terminal 17 and the covering member 20. The resin pieces are composed of a polyolefin resin, such as polyethylene, polypropylene, modified polyethylene, or modified polypropylene.

The secondary battery having such a configuration is manufactured, e.g., in the following procedure.

First, the laminated packaging material according to an embodiment is deep drawn or punch stretched to fabricate a rectangular covering member 20.

Then, the cathode active material, the conductive agent, and the binder are mixed, and a dispersing solvent such as N-methyl-2-pyrrolidone is added thereto to prepare an cathode mixture slurry, after which this positive electrode mixture slurry is coated to both or one of the surfaces of the positive electrode collector 11A, dried, and compression-molded to form the cathode mixture layer 11B. The positive electrode 11 is thus fabricated.

Furthermore, the anode active material and the binder are mixed, and a dispersing solvent such as N-methyl-2-pyrrolidone is added thereto to prepare an anode mixture slurry, after which the anode mixture slurry is coated to both or one of the surfaces of the negative electrode collector 12A, dried, and compression-molded to form the anode mixture layer 12B. The negative electrode 12 is thus fabricated.

Then, e.g., the electrolyte layer 14 is formed on each of the positive electrode 11 and the negative electrode 12. Thereafter, the positive electrode terminal 16 is attached to the positive electrode collector 11A by welding, and also the negative electrode terminal 17 is attached to the negative electrode collector 12A by welding.

Then, the positive electrode 11 and the negative electrode 12 each having the electrolyte layer 14 formed thereon are laminated via the separator 13 and further wound, and then the protective tape 15 is bonded to the outermost surfaces, to form the battery element 10.

Finally, e.g., the covering member 20 is folded, the battery element 10 is put between the folded portions of the covering member 20, and outer edges of the covering member 20 are intimately bonded by fusion to seal the battery element 10 therein. In doing so, the resin strips 30 are inserted between the positive electrode terminal 16/the negative electrode terminal 17 and the covering member 20, respectively. As a result, the secondary battery shown in FIG. 1 is completed.

Thus, in embodiments, flexibility and rigidity in the adhesive layer of the covering member are well balanced, so that reliability is high for deeper molding, and adhesion strength between the metal layer and the adhesive layer is not reduced even if a highly permeable substance or the like such as an electrolyte solution is packaged for a long time period, thereby making it possible to reduce the occurrence of delaminations.

EXAMPLES

Manufacture of Adhesive Composition Type 1

A method for manufacturing an adhesive composition used in Example 1-1 will be described as an example. First, a dilute solution (a concentration of 1 mass %) of a polyethylene resin ("EL-413" manufactured by Toyo-Morton, Ltd. (2 to 3 hydroxyl groups/1000 monomer units)) having hydroxyl groups in a side chain was prepared. Then, 30 mL of the obtained dilute solution was mixed with 60 mL of a dilute solution (a concentration of 5 mass %) of a polyfunctional isocyanate (tradename "COLONATE HX" manufactured by Nippon Urethane Industry Ltd.). When a polyfunctional amine compound is further added, 6 mL of a dilute solution (a concentration of 5 mass %) of 2,4-tolylenediamine (manufactured by ALDRICH) was added to the resultant dilute solution for mixture. Adhesive Composition Type 1 was thus prepared. As a solvent for the dilute solutions, toluene was used. Adhesive Composition Type 1 was prepared at 23° C. and at a humidity of 10,000 ppm.

(Manufacture of Adhesive Composition Type 2)

A method for manufacturing an adhesive composition used in Example 1-8 will be described as an example. Adhesive Composition Type 2 was prepared similarly to Adhesive Composition Type 1, except that a polyethylene resin (a number-average molecular weight of 2000 and a hydroxyl number of 50 mg KOH/g) having hydroxyl groups in a side chain was used as an adhesive resin, and that a mixture of toluene and methylethylketone in a 80:20 volumetric ratio was used as a solvent.

(Laminated Packaging Material 1)

Laminated packaging material 1 was fabricated in a below-indicated structure. An adhesive composition was coated over the entire surface of a metal layer by the gravure coating method, and dried at 120° C. to remove solvent(s). Then, a resin film for an inner layer was laminated on the coated surface, and compression-bonded into a laminate by a roll heated to 80° C. An outer layer was similarly bonded. Thereafter, the resultant laminate was kept for 7 days at 50° C. to cure adhesive layers.

Inner Layer:
Polypropylene (PP) film
(thickness: 30 μm)
First Adhesive Layer:
Adhesive Composition Type 1 or 2
(thickness: 5 μm)
Metal layer:
Aluminum foil (thickness: 50 μm)
Second Adhesive Layer*:
Epoxy curing agent adhesive composition
(thickness: 5 μm)
*Obtained by adding ethylene oxide to "EL-451" manufactured by Toyo-Morton, Ltd., as a curing agent.
Outer Layer:
Polyethylene terephthalate (PET) film (thickness: 30 μm)

(Laminated Packaging Material 2)

Laminated packaging material 2 was fabricated similarly to laminated packaging material 1, except for a below-indicated structure.

Inner Layer:
Polypropylene (PP) film
(thickness: 30 μm)
First Adhesive Layer*:
Epoxy curing agent adhesive composition
(thickness: 5 μm)
*Obtained by adding ethylene oxide to "EL-451" manufactured by Toyo-Morton, Ltd., as a curing agent.
Metal Layer:
Aluminum foil (thickness: 50 μm)
Second Adhesive Layer:
Adhesive Composition Type 1 or 2
(thickness: 5 μm)
Outer Layer:
Polyethylene terephthalate (PET) film
(thickness: 30 μm)

(Laminate Strength Test)

Peel strength on an approximately 15 mm-wide test pieces of the laminated packaging materials was measured (peeling speed: 50 mm/min).

Initial strength: Measurements were made on the laminated packaging materials after they were completely cured and thereafter kept for 24 hours at 23° C.

Immersion test into electrolyte solution: Each laminated packaging material was shaped into a pouch by a 3 mm-deep drawing process using a mold having a rectangular ratio of 40 mm×60 mm, and the pouch was filled with an electrolyte solution and its four sides were sealed by fusion bonding. The electrolyte solution was composed of a mixture of EC (ethylenecarbonate) and PC (propylenecarbonate) in a 6:4 ratio, and 0.7 mol/kg $LiPF_6$. The laminated packaging materials were kept for 50 hours at 40° C. and 90% RH, after which the electrolyte solution was removed, and the laminated packaging materials were cleaned with DMC (dimethylcarbonate) and then dried. Thereafter, the laminate strength was measured on their deep-drawn portions.

(Pinhole Test)

The deep-drawn laminate films were inspected using PH-100 manufactured by HAMAMATSU PHOTONICS K.K. Any film sample for which a signal indicative of a pinhole or an over-range was detected was exposed to light from a light source in a dark room, to visibly check pinhole spots. Any visibly checked pinhole was evaluated as a pinhole occurrence.

(Delamination Test)

The laminated packaging materials were subjected to a 5 mm-deep drawing process with the mold having a rectangular ratio of 40 mm×60 mm, was kept for 96 hours in a dry open environment at 120° C. Observations were made on five similar test pieces to check if there is any delamination (floating, peeling, and the like) or not.

Examples 1-1 to 1-9

Evaluations were made as to a relationship between the amount of amine added and the physical properties of a film for cases where an adhesive composition having amine added to its inner layer was used. Using laminated packaging material 1 as a structure of the film, the inner layer was bonded to adhesive compositions shown in Table 1. Examples 1-2 to 1-7 were prepared by adjusting the amount of 2,4-tolylenediamine added in the adhesive composition of Example 1-1. Example 1-9 was prepared by adjusting the amount of 2,4-tolylenediamine added in the adhesive composition of Example 1-8. Evaluation results are shown in Table 1.

TABLE 1

| | Film structure: Laminated Packaging Material 1 | | | | | | |
|---|---|---|---|---|---|---|---|
| | | | | LAMINATE STRENGTH | | | |
| | ADHESIVE COMPOSITION TYPE | AMOUNT OF ISOCYANATE ADDED (NCO/OH) (mol/mol) | AMOUNT OF AMINE ADDED ($NH_2$/NCO) (mol/mol) | INITIALLY N/15 mm | AFTER IMMERSION INTO ELECTROLYTE SOLUTION N/15 mm | PINHOLE (CRACK) DEPTH mm | DELAMINATION PIECES |
| EXAMPLE 1-1 | 1 | 2.5 | 0.01 | 8.42 | 5.35 | 6.43 | 1 |
| EXAMPLE 1-2 | | 2.5 | 0.05 | 9.45 | 6.89 | 7.39 | 0 |
| EXAMPLE 1-3 | | 2.5 | 0.10 | 9.53 | 7.02 | 7.47 | 0 |
| EXAMPLE 1-4 | | 2.5 | 0.15 | 9.37 | 6.96 | 7.39 | 0 |
| EXAMPLE 1-5 | | 2.5 | 0.20 | 9.01 | 6.54 | 7.27 | 0 |
| EXAMPLE 1-6 | | 2.5 | 0.30 | 8.73 | 6.22 | 7.17 | 0 |
| EXAMPLE 1-7 | | 2.5 | 0.35 | 8.01 | 5.04 | 6.40 | 1 |
| EXAMPLE 1-8 | 2 | 2.5 | 0.10 | 10.76 | 8.93 | 6.99 | 0 |
| EXAMPLE 1-9 | | 2.5 | 0.30 | 10.11 | 8.10 | 6.72 | 0 |
| COMPARATIVE EXAMPLE 1-1 | 1 | 2.5 | 0 | 8.31 | 5.21 | 6.32 | 2 |
| COMPARATIVE EXAMPLE 1-2 | 2 | 2.5 | 0 | 9.35 | 6.42 | 5.94 | 4 |

From the result of a comparison with Example 1-1 with Comparative Example 1-1, it is demonstrated that the addition of amine increases the laminate strength, and also provides advantages for pinhole depths and of reducing delaminations. Furthermore, also in Examples 1-8, 1-9 using Adhesive Composition Type 2, the addition of amine is similarly advantageous. Furthermore, from the results about Examples 1-1 to 1-7, it is understood that the amount of amine added is preferably in a range from 0.05 to 0.30 (in terms of the molar ratio of an amino group to an isocyanate group) since a tendency was observed that delaminations start when the amount of amine added is less than 0.05 or exceeds 0.30.

Examples 2-1 to 2-9

Evaluations were made as to a relationship between the amount of amine added and the physical properties of a film for cases where an adhesive composition having amine added to its outer layer was used. The evaluations were made similarly to those for Examples 1-1 to 1-9 except that laminated packaging material 2 was used as a structure of the film. Evaluation results are shown in Table 2.

TABLE 2

Film structure: Laminated Packaging Material 2

| | ADHESIVE COMPOSITION TYPE | AMOUNT OF ISOCYANATE ADDED (NCO/OH) (mol/mol) | AMOUNT OF AMINE ADDED ($NH_2$/NCO) (mol/mol) | LAMINATE STRENGTH INITIALLY N/15 mm | LAMINATE STRENGTH AFTER IMMERSION INTO ELECTROLYTE SOLUTION N/15 mm | PINHOLE (CRACK) DEPTH mm | DELAMINATION PIECES |
|---|---|---|---|---|---|---|---|
| EXAMPLE 2-1 | 1 | 2.5 | 0.01 | 9.77 | 6.64 | 6.19 | 0 |
| EXAMPLE 2-2 | | 2.5 | 0.05 | 10.93 | 8.76 | 7.35 | 0 |
| EXAMPLE 2-3 | | 2.5 | 0.10 | 11.25 | 9.41 | 7.68 | 0 |
| EXAMPLE 2-4 | | 2.5 | 0.15 | 10.87 | 8.78 | 7.42 | 0 |
| EXAMPLE 2-5 | | 2.5 | 0.20 | 10.64 | 8.62 | 7.23 | 0 |
| EXAMPLE 2-6 | | 2.5 | 0.30 | 10.23 | 8.33 | 6.87 | 0 |
| EXAMPLE 2-7 | | 2.5 | 0.35 | 9.36 | 7.15 | 6.40 | 2 |
| EXAMPLE 2-8 | 2 | 2.5 | 0.10 | 11.34 | 7.76 | 7.41 | 0 |
| EXAMPLE 2-9 | | 2.5 | 0.30 | 11.16 | 7.32 | 7.38 | 0 |
| COMPARATIVE EXAMPLE 2-1 | 1 | 2.5 | 0 | 9.73 | 6.66 | 6.20 | 2 |
| COMPARATIVE EXAMPLE 2-2 | 2 | 2.5 | 0 | 10.50 | 6.97 | 6.57 | 3 |

As demonstrated by the results shown in Table 2, the laminate strength was increased, and also the advantages for pinhole depths and of reducing delaminations were also provided.

Furthermore, from the results about Examples 1-1 to 1-9 and Examples 2-1 to 2-9, it is understood that the advantages were obtained by introducing the adhesive compositions according to embodiments into any of the adhesive layers of the packaging materials. Accordingly, it is verified that the adhesive compositions may be introduced into either one or both layers in order to ensure moldability and other battery performance.

Examples 3-1 to 3-11

Evaluations as to physical properties were made under conditions that a certain amount of an amine compound was added to isocyanate (curing agent) and the amount of the curing agent added to an adhesive (main agent) is varied. Using laminated packaging material 1 as a structure of a film, the inner layer was bonded by applying adhesive compositions shown in Table 3 to the first adhesive layer. Results are shown in Table 3.

TABLE 3

Film structure: Laminated Packaging Material 1

| | ADHESIVE COMPOSITION TYPE | AMOUNT OF ISOCYANATE ADDED (NCO/OH) (mol/mol) | AMOUNT OF AMINE ADDED ($NH_2$/NCO) (mol/mol) | LAMINATE STRENGTH INITIALLY N/15 mm | LAMINATE STRENGTH AFTER IMMERSION INTO ELECTROLYTE SOLUTION N/15 mm | PINHOLE (CRACK) DEPTH mm | DELAMINATION PIECES |
|---|---|---|---|---|---|---|---|
| EXAMPLE 3-1 | 1 | 1.1 | 0.1 | 8.53 | 5.96 | 5.55 | 0 |
| EXAMPLE 1-3 | | 2.5 | 0.1 | 9.53 | 7.02 | 7.47 | 0 |
| EXAMPLE 3-2 | | 5.0 | 0.1 | 9.46 | 7.35 | 7.45 | 0 |
| EXAMPLE 3-3 | | 7.5 | 0.1 | 9.30 | 6.94 | 7.31 | 0 |
| EXAMPLE 3-4 | | 10.0 | 0.1 | 9.10 | 6.85 | 7.16 | 0 |
| EXAMPLE 3-5 | | 12.5 | 0.1 | 8.98 | 6.69 | 7.05 | 0 |
| EXAMPLE 3-6 | | 15.0 | 0.1 | 8.51 | 6.32 | 7.00 | 0 |
| EXAMPLE 3-7 | | 17.5 | 0.1 | 7.74 | 5.97 | 6.02 | 0 |
| EXAMPLE 3-8 | 2 | 1.0 | 0.1 | 9.67 | 7.61 | 6.26 | 0 |
| EXAMPLE 3-9 | | 2.5 | 0.1 | 10.76 | 8.93 | 6.99 | 0 |
| EXAMPLE 3-10 | | 5.0 | 0.1 | 10.55 | 8.43 | 6.89 | 0 |
| EXAMPLE 3-11 | | 10.0 | 0.1 | 10.12 | 8.27 | 6.72 | 0 |
| COMPARATIVE EXAMPLE 1-1 | 1 | 2.5 | 0 | 8.31 | 5.21 | 6.32 | 3 |

From the above results, it is understood that the amount of the curing agent added is suitable when it is equal to or greater than the number of active hydrogen groups in the adhesive. Meanwhile, the curing becomes insufficient with smaller amounts of the additive, whereas the curing agent not contributing to cross-linking increases with increasing amounts of the additive. Since the curing agent not contributing to cross-linking acts as a plastic agent, even if the amine compound were added, its effect would be less. Accordingly, it can be said that the amount of polyfunctional isocyanates may preferably be in such a range as to satisfy a relational formula of $[(NCO/XH)-(NCO/XH)\times(NH_2/NCO)] \geqq 1$.

Examples 4-1 and 4-2

In order to evaluate the applicability of embodiments without limitation of adhesive compositions, advantages of the addition of a polyfunctional amine compound were checked by varying an adhesive component (the main agent) in adhesive compositions. Conditions other than the adhesive were similar to those in Example 1-3. Using laminated packaging material 1 as a structure of a film, its inner layer was bonded by adhesive compositions shown in Table 4. Results are shown in Table 4.

The following adhesives were used.
Polyester Adhesive:
5016A/B manufactured by Diabond Industry, Co., Ltd.
Polyethylene Adhesive:
"EL-413" manufactured by Toyo-Morton, Ltd., similarly to Example 1-3 mentioned above
Polyurethane Adhesive:
"AD502" manufactured by Toyo-Morton, Ltd.

TABLE 4

Film structure: Laminated Packaging Material 1

| Adhesive Composition | | Amount of Isocyanate Added | Amount of Amine Added | Laminate Strength | | Pinhole (Crack) Depth | Delamination |
| --- | --- | --- | --- | --- | --- | --- | --- |
| Adhesive Structure | Type | (NCO/OH) (mol/mol) | ($NH_2$/NCO) (mol/mol) | Initially N/15 mm | After Immersion Into Electrolyte Solution N/15 mm | mm | Pieces |
| EXAMPLE 4-1 | POLYESTER | 1 | 2.5 | 0.1 | 6.00 | 4.55 | 6.21 | 0 |
| EXAMPLE 4-2 | POLYURETHANE | | | | 8.29 | 5.85 | 6.83 | 0 |
| EXAMPLE 1-3 | POLYETHYLENE | | | | 9.53 | 7.02 | 7.47 | 0 |
| EXAMPLE 1-8 | POLYETHYLENE | 2 | | | 10.76 | 8.93 | 6.99 | 0 |
| COMPARATIVE EXAMPLE 4-1 | POLYESTER | 1 | 2.5 | 0 | 5.34 | 2.89 | 5.65 | 5 |
| COMPARATIVE EXAMPLE 4-2 | POLYURETHANE | | | | 7.55 | 4.44 | 6.20 | 0 |
| COMPARATIVE EXAMPLE 1-1 | POLYETHYLENE | | | | 8.31 | 5.21 | 6.32 | 2 |
| COMPARATIVE EXAMPLE 1-2 | POLYETHYLENE | 2 | | | 9.35 | 6.42 | 5.94 | 4 |

From the above results, all the adhesives evaluated were found effective, although in different degrees due to their compatibility with resins used as sealants.

As described in the foregoing in detail, the present application relates to a laminated packaging material subject to molding, and a battery packaging member and a battery both using the laminated packaging material. According to embodiments, flexibility and rigidity in the adhesive layer are so well-balanced that a packaging material can be provided in which reliability is high for deeper molding, adhesion strength between the metal layer and the adhesive layer is not reduced and thus occurrence of delaminations is suppressed even if a highly permeable substance or the like is packed for a long period of time. Taking advantage of such features, embodiments is utilized in a variety of fields, not only as a laminated battery packaging member, but also as packaging materials for daily necessities, food products, pharmaceutical products, medical equipment, photosensitive materials, printing inks, and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laminated packaging material comprising:
    an inner layer composed of resin film;
    a first adhesive layer;
    a metal layer;
    a second adhesive layer; and
    an outer layer composed of resin film,
    wherein at least one of the first adhesive layer or the second adhesive layer is composed of an adhesive composition, as an essential component, selected from the group consisting of a resin having an active hydrogen group in a side chain, polyfunctional isocyanates, and a polyfunctional amine compound,
    wherein the adhesive composition has a molar ratio ($NH_2$/NCO) of an amino group in the polyfunctional amine compound to an isocyanate group in the polyfunctional isocyanates, ranging from 0.05 to 0.30.

2. The laminated packaging material according to claim 1, wherein the adhesive composition has a molar ratio (NCO/XH) of an isocyanate group to an active hydrogen group in the resin having an active hydrogen group in a side chain, ranging from 1.0 to 15.0.

3. A battery comprising:
    a battery element including a positive electrode and a negative electrode each of which is formed with an electrolyte, and a separator, the positive electrode and the negative electrode being staked and spirally wound together via the separator; and
    a covering member containing the battery element and including a laminated packaging material,
    wherein the laminated packaging material includes
    an inner layer composed of resin film, a first adhesive layer, a metal layer, a second adhesive layer, and an outer layer composed of resin film, and
    wherein at least one of the first adhesive layer or the second adhesive layer is composed of an adhesive composition, as an essential component, selected from the group consisting of a resin having an active hydrogen group in a side chain, polyfunctional isocyanates, and a polyfunctional amine compound, and
    wherein the adhesive composition has a molar ratio ($NH_2$/NCO) of an amino group in the polyfunctional amine compound to an isocyanate group in the polyfunctional isocyanates, ranging from 0.05 to 0.30.

4. The battery according to claim 3, wherein the adhesive composition has a molar ratio (NCO/XH) of an isocyanate group to an active hydrogen group in the resin having an active hydrogen group in a side chain, ranging from 1.0 to 15.0.

5. The battery according to claim 3, wherein the battery packaging member is molded by deep drawing or punch stretching using the laminated packaging material.

* * * * *